Dec. 31, 1946.    R. B. BLOORE    2,413,540
APPARATUS FOR TRIMMING HANDLES AND THE LIKE FOR POTTERY GOODS
Filed Nov. 30, 1944    6 Sheets-Sheet 2
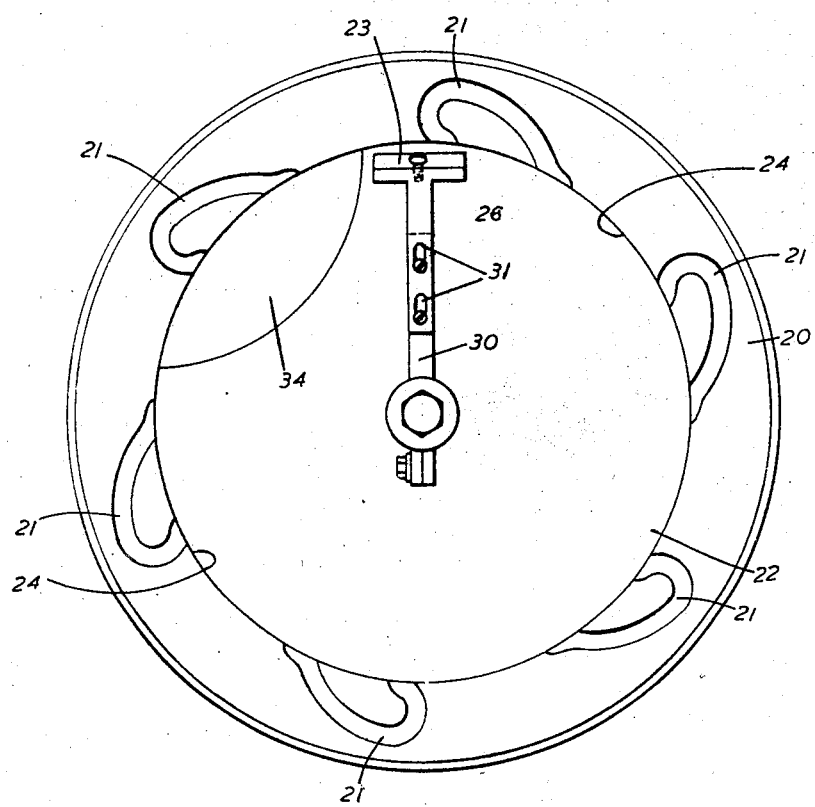
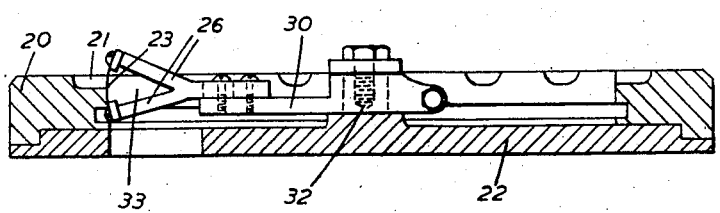
Robert Boulton Bloore, Inventor,
By Frank A. Appleman
Attorney

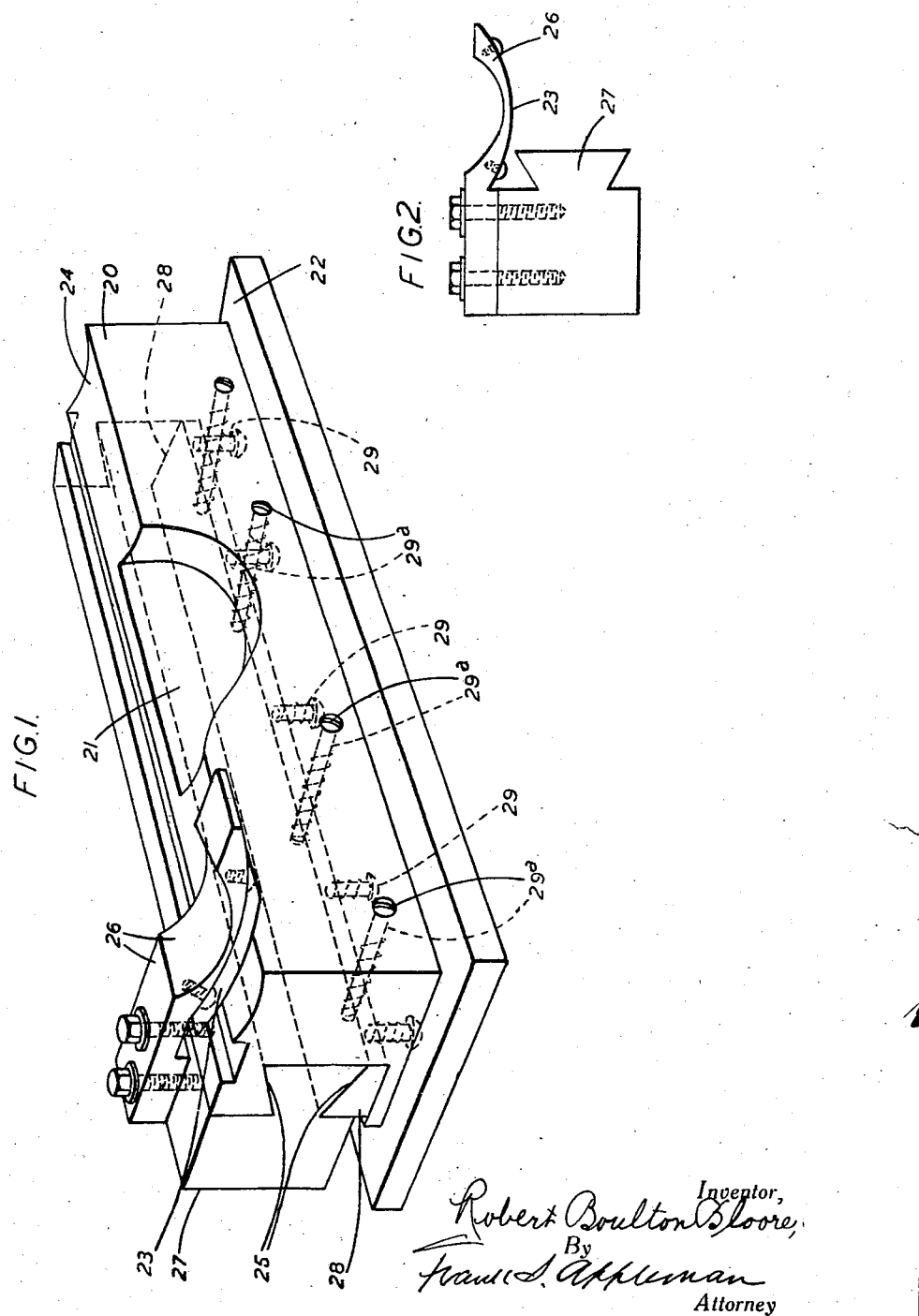

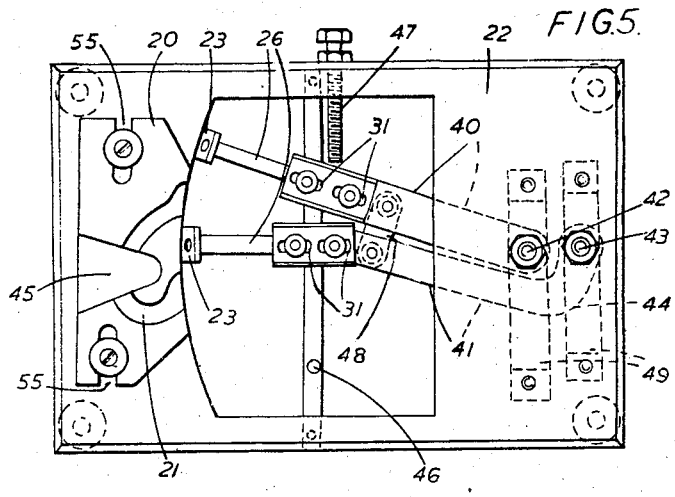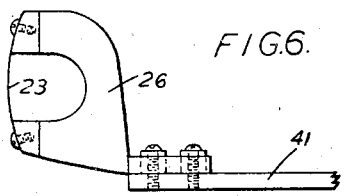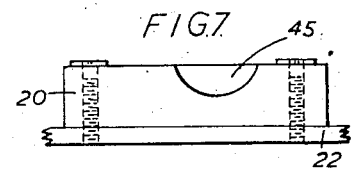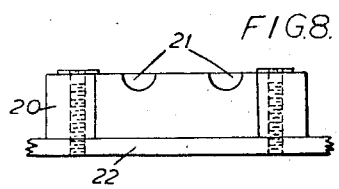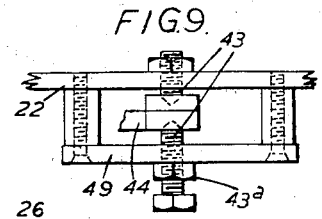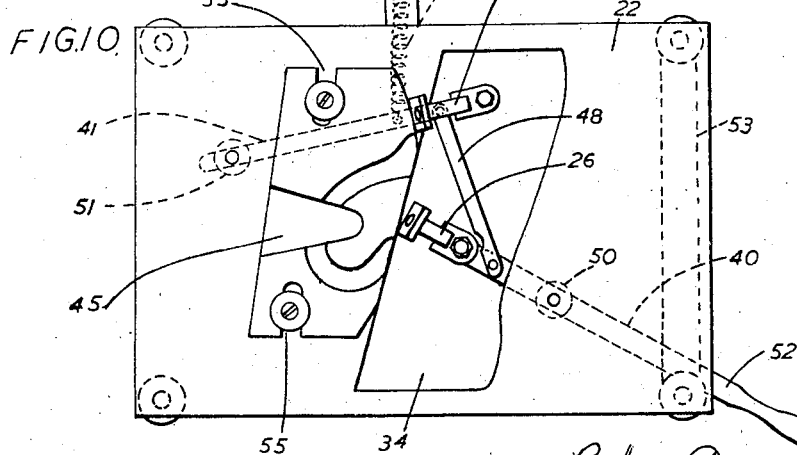

Dec. 31, 1946.  R. B. BLOORE  2,413,540
APPARATUS FOR TRIMMING HANDLES AND THE LIKE FOR POTTERY GOODS
Filed Nov. 30, 1944  6 Sheets-Sheet 4
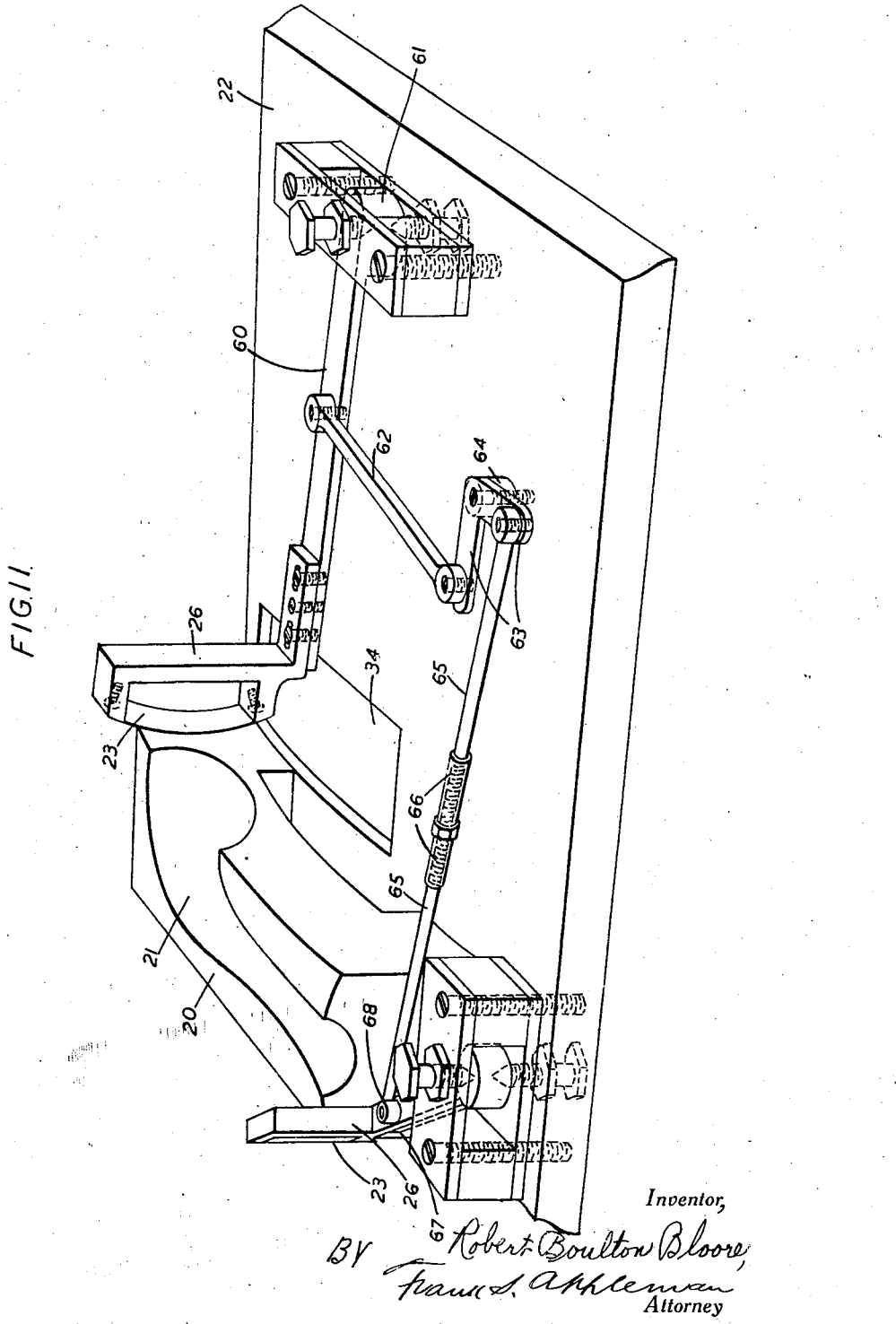

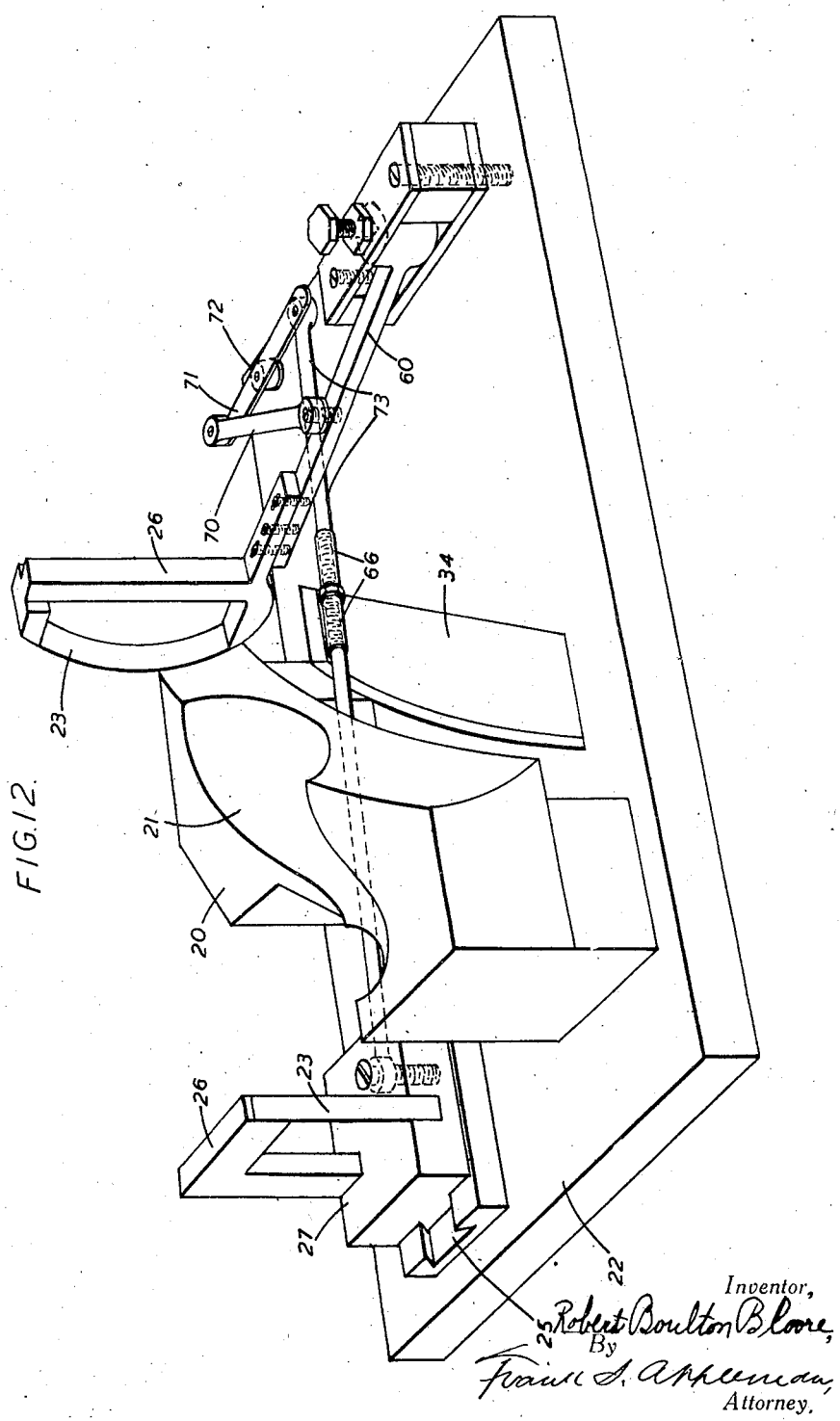

Dec. 31, 1946.       R. B. BLOORE       2,413,540
APPARATUS FOR TRIMMING HANDLES AND THE LIKE FOR POTTERY GOODS
Filed Nov. 30, 1944       6 Sheets-Sheet 6

Inventor,
Robert Boulton Bloore,
By
Frank S. Appleman
Attorney

Patented Dec. 31, 1946

2,413,540

UNITED STATES PATENT OFFICE 2,413,540

APPARATUS FOR TRIMMING HANDLES AND THE LIKE FOR POTTERY GOODS

Robert Boulton Bloore, Newcastle-under-Lyme, England, assignor to Swinnertons Limited, Stoke-on-Trent, England Application November 30, 1944, Serial No. 565,972

In Great Britain December 1, 1943

3 Claims. (Cl. 25—104)

This invention relates primarily to the manufacture of handles for such articles of pottery as teacups, mugs, jugs, teapots and so forth. The invention can also be applied to the manufacture of other articles which require after manufacture to be attached to the body of a vessel or other piece of pottery; for instance it could be used in connection with the manufacture of spouts for teapots and similar pouring vessels.

It will be apparent that in order to make good joints between an article such as a handle and the side wall of the body of a tea-cup or other vessel, the portion or portions of the handle or the like which are to unite with the wall of the vessel must first be trimmed or shaped so that they coincide exactly with the face of the wall of the cup. Not only must the handle be made to fit the radius of the cup or the like, but it must also be made to fit the vertical line of the cup, which is often curved or sloping. In the case of an open handle, therefore, the ends must be trimmed, and in the case of a block handle the whole length of that side of the handle which is to fit against the side of the cup must be made to conform, and this has involved an additional trimming or similar operation after the handle has been attached to the cup whereby the clay is pressed up against the wall of the cup to avoid leaving a crevice between the cup and handle.

These trimming operations, both prior to and after the attachment of the handle, are highly skilled and take up much time, and if they are not done correctly a high proportion of the ware becomes defective in firing.

The objects of the present invention are to dispense with these skilled operations, to provide means whereby handles and the like can be produced and trimmed to fit the contours of the vessels with absolute certainty without relying on the skill of the operators, and to make provision for trimming to suit a wide variety of contours.

According to the present invention a handle or other attachment which requires to be trimmed so as to conform to the contour of an article in both the vertical and horizontal directions is acted upon by a tool which is shaped to produce the required contour in one direction and which is caused to travel in relation to the handle or the like so as to produce the required contour in the other direction.

Referring to the drawings which form a part of this specification.

Figure 1 is a perspective view of an arrangement wherein the cutter is slidably movable.

Figure 2 is an end view of the sliding cutter.

Figures 3 and 4 are a plan and cross-section respectively of an arrangement wherein the cutter rotates.

Figure 5 is a plan showing an arrangement wherein there are two separate cutters, one for each end of the handle, mounted on separate pivots.

Figure 6 is a side view of one of the cutters.

Figures 7 and 8 are back and front views respectively of the holder or die.

Figure 9 is an end view showing the pivotal mounting of the cutters.

Figure 10 is a plan showing another arrangement of two separate cutters, differing from Figure 5 in that one of the cutters is pivoted on the opposite side of the holder or die from the other.

Figure 11 is a perspective view showing another arrangement of two pivoted cutters.

Figure 12 is a perspective view showing an arrangement where one cutter is pivoted and the other moves slidably.

Figure 13:
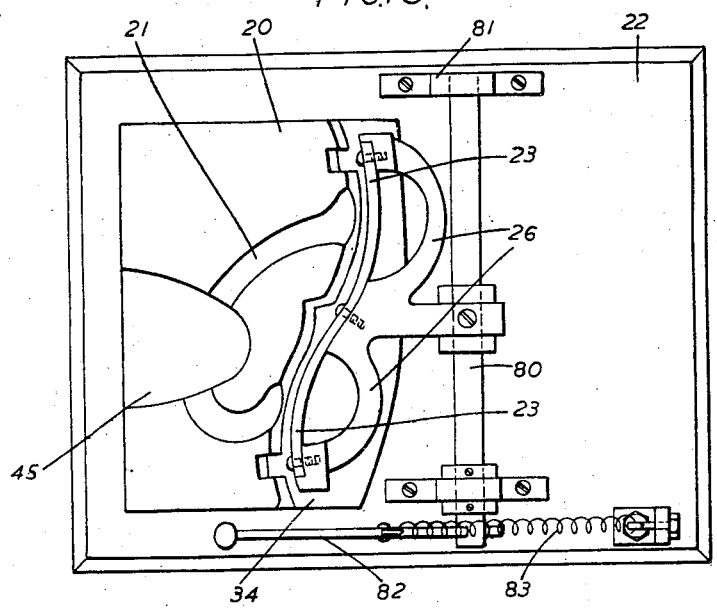
Figures 13 and 14 are a plan and elevation respectively of an arrangement having two pivoted cutters which travel across the handle instead of along it.

All the figures show the devices acting in connection with handles except Figures 11 and 12 which show the devices acting in connection with spouts for teapots or the like.

Figures 1 and 2 show the most simple case where the cup or the like has straight sides, which can be either sloping or vertical, but a similar arrangement could also be used if the vessel has curved or irregular sides. The holder 20 is in the form of a die recessed at 21 to receive the handle with the portions to be trimmed projecting slightly from the edge of the die; the holder shown only receives one handle, but a holder could be extended to receive a series of handles, and it is possible that more than one edge of the holder could be used for trimming. In the case of a block handle (that is to say, a handle in which the finger opening, if any, is surrounded by clay before the handle is attached to the vessel), the whole of that side of the handle which is to unite with the body of the vessel will project for trimming. This form of handle recess is shown in the figure. In the case of an open handle (that is to say, a handle which is more or less C-shaped and of which only the two ends unite with the body of the vessel), there would be a length of profile of the holder between the two handle ends. The die or holder 20 may be made of metal and is secured to a base or block 22. The cutting tool 23 moves slidably along the profile edge 24 of the die and corresponds to the cross-sectional form of the profile. The profile itself corresponds, when viewed in cross-section transversely, with the radius or other horizontal contour of the vessel at the points where the handle is to be attached, and when viewed in side elevation it corresponds with the vertical line of the side wall of the vessel at the points where the handle is to be attached. Although the tool 23 could be simply held in the hand of the operator and moved along the profile 24, it is preferable to guide it as shown by means of a protruding dovetail or similar formation or recess 25 on the opposite face of the die to that which receives the handle, and the tool-holder 26 is therefore carried by a member 27 which is shown as a block but could be in the form of a roller or the like and which is arranged to fit closely round or within or otherwise engage with the dovetail or the like 25 so that side play during the travel of the cutting tool is prevented. The tool holder or the member 27 may serve as a handle to control the to and fro motion of the tool, or a separate handle may be provided, or alternatively the to and fro motion of the tool may be achieved mechanically. Alternatively the die may move and the tool remain stationary. Wear on the member 27 in the dovetail 25 is taken up by the adjustable slide rail 28 which is pressed upwards to the desired extent by set screws 29 and held rigidly by further set screws 29ª.

Figures 3 and 4 show an alternative arrangement where the cup or the like has curved sides and the curvature at the handle ends, or throughout the length of the handle in the case of a block handle, is an arc of a circle. The profile edge 24 of the holder is made to conform to that arc, and the cutting tool 23 and tool-holder 26 are carried by a pivoted arm 30 so that the tool is caused to travel round on the appropriate radius. The tool-holder is attached to the arm 30 by slotted connections 31 allowing for adjustment of the radius. The handle-holder or die 20 is in the form of an annular die mounted on a suitable base or seating 22, its inner periphery being shaped as the profile edge 24, the upper face of the die being recessed at 21 to receive a number of handles. The arm 30 is pivotally mounted centrally of the die at 32. Wear can be taken up by the adjustment 31. The tool holder 26 is forked or formed with an opening 33 immediately behind the cutter to allow the trimmings to clear themselves. The base is provided with a hole 34 for clay scraps. In some cases it might be more convenient to have the die segmental to receive only one or a small number of handles at a time, instead of annular to receive a number; this will depend largely upon the individual circumstances at different factories. Further, it might be more convenient to use the outer periphery of the die as the profile edge, either instead of or in addition to the inner edge. Again, it might be convenient to have the tool fixed and to rotate the holder.

In Figures 5, 6, 7, 8 and 9 an arrangement is shown where the vessel has curved sides, but the curvature at one end of the handle is different from the curvature at the other end of the handle. The holder or die 20 is provided with a handle recess 21 as before and is fixed to a base member 22 on which two arms 40, 41 are mounted on separate pivots 42, 43, each arm carrying a tool holder 26 and cutting tool 23, one cutting tool being arranged to act on each end of the handle. The two arms 40, 41 will usually be of different lengths. In this way the two cutting tools can be arranged to act on the handle ends at any required curvatures. Either or both arms may be cranked as at 44 so that after having acted on the handle ends the tools will move well clear thereof so that they do not obstruct the removal of the handle from the die. This removal is facilitated by a finger recess 45 in the die. The profile edge of the die may be straight or curved as found most convenient. The tool holders are shaped to act as handles. The movement of the arms in each direction is limited by stops 46, 47, the backward stop 47 being an adjustable screw. The pivots 42, 43 for the arms 40, 41 consist of set screws passed through the base 22 into brackets 49 on the underside thereof having pointed ends which engage in recesses in the arms, the lower one being adjustable to take up wear and having a lock nut 43ª.

It will have been noted that in Figures 5, 6, 7, 8 and 9 the curvatures of the two ends of the handle are similar, that is to say both concave, and both arms 40, 41 are pivoted on the same side of the die, so that the tools swing across the profile in the same general direction, although as stated they might not be mounted on radii of equal length. It may happen, however, that the curvature of the two ends of a handle are not similar, for instance one end may be convex and the other concave; in this case one arm may be pivoted on one side of the die as shown at 50 in Figure 10 and the other arm is pivoted at 51 at the opposite side of the die to the profile edge. Thus the arm 40 produces a concave cut as before but the arm 41 produces a convex cut. The two arms 40, 41 are connected by a link or coupling 48 in both Figure 5 and Figure 10 so that the movement of one of them will also operate the other. The arm 40 is extended in the form of a handle 52 which is guided by a rail 53 to prevent side play in its operation. The movement of the arms is resisted by a spring 54 which acts to return the tools on release of the handle 52. The die has a finger recess 45 as before and the base a hole 34 for clay scraps. The die is adjustably mounted on the base by means of the slots 55. Any other suitable type of linkage may be provided for connecting the two arms together, and the spring-loading could be applied to the linkage instead of to one of the arms.

In Figure 11 an arm 60 is pivoted at 61 and carries a tool holder 26 and cutting tool 23. When actuated as before the arm 60 actuates also a push rod 62 which acts upon a bell-crank lever 63 pivoted at 64 which in turn operates another push rod 65 which incorporates an adjustable coupling 66. The rod 65 acts upon a further tool arm 67 to which it is pivotally connected at 68, the arm 67 carrying a tool holder 26 and cutting tool 23. The die 20 is recessed at 21 to receive a tea-pot spout and the two arms 60, 67 act to effect the shaping of the base and pouring snip of the spout respectively, the base requiring to be trimmed to fit the body of the vessel in the same way as the handles already described.

Figure 12 shows an arrangement of a somewhat similar nature, but in this case the arm 60 has a pivoted lever 70 which actuates a further lever 71 pivoted at 72 which in turn actuates a push rod 73 to operate a sliding tool 23 carried by a holder 26 mounted on a member 27 sliding in a dovetail 25 on the base 22, somewhat after the manner of Figures 1 and 2, except that in those figures the dovetail 25 was formed on the die; that, however, is entirely optional. Thus one end of the device (which is shown as a teapot spout but could equally well be a handle) is trimmed by a pivoted cutting tool and the other by a sliding tool.

Figure 14:
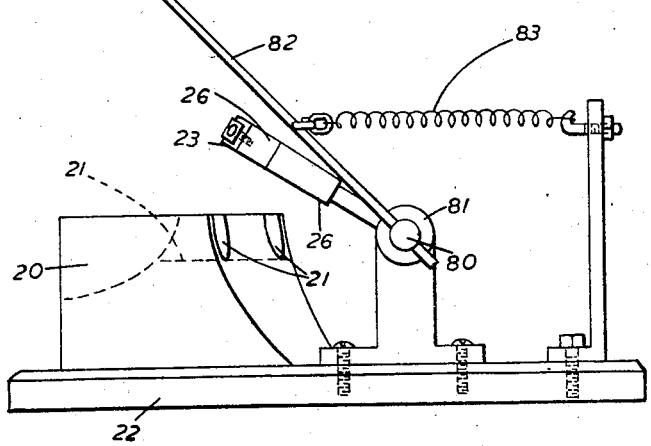

In the foregoing arrangements the cutting tool travels parallel with the length of the handle; in another alternative the arm is pivoted in a plane at right angles so that it travels transversely across the handle, as shown in Figures 13 and 14. This arrangement might be useful in connection with certain special or unusual shapes of vessel as well as the more ordinary shapes. The pivotal mounting of the tool now achieves the transverse curvature of the handle ends to fit the radius of the cup, and the longitudinal curvature of the handle ends, or any other required longitudinal formation, is achieved by the travel of the correspondingly shaped tool across the handle ends. The tool holder 26 is mounted on a shaft 80 which is carried in bearings 81 and partly rotated by a handle 82 against the action of a spring 83. Two tools 23 are provided. In some cases the tools might be mounted on separate pivots and move through different arcs. This same line of travel of the tools in relation to the article to be trimmed could also be used with a sliding tool.

In the last-mentioned or any of the other arrangements the mechanism may be mounted under the base plate and operated by treadle or other means, and also it may be convenient to have a travelling or revolving die or holder as well as or instead of the pivotally mounted tool or tools.

It may be possible to shape the handles or the like in the actual die which forms the holder for them during the trimming operation.

Having now described my invention what I claim as new and desire to secure by Letters Patent is:

1. Apparatus for trimming handles and the like for pottery goods comprising a support for the handles, said support so formed that the portions of the article requiring trimming project into the path of moving cutters whose paths are predetermined to correspond with the vertical line of the vessel, said cutters comprising two separately pivoted cutting tools, one for each end of the handle or the like.

2. Apparatus according to claim 1 wherein the two cutting tools move in similar arcs but not necessarily at the same radius.

3. Apparatus according to claim 1 wherein the two cutters do not move in similar arcs, one being arranged to produce a convex cut and the other a concave cut.

ROBERT BOULTON BLOORE.